United States Patent [19]

Kratz et al.

[11] Patent Number: 4,477,264
[45] Date of Patent: Oct. 16, 1984

[54] PRESSURE SWING ADSORPTION PROCESS FOR A MEDICAL OXYGEN GENERATOR FOR HOME USE

[75] Inventors: Wilbur C. Kratz, Macungie; Shivaji Sircar, Wescosville, both of Pa.

[73] Assignee: Air Products and Chemicals, Inc., Allentown, Pa.

[21] Appl. No.: 480,448

[22] Filed: Mar. 30, 1983

[51] Int. Cl.³ .............................................. B01D 53/04
[52] U.S. Cl. .......................................... 55/25; 55/31; 55/33; 55/58; 55/62; 55/68; 55/75
[58] Field of Search .................... 55/25, 26, 31, 33, 35, 55/58, 62, 68, 74, 75

[56] References Cited

U.S. PATENT DOCUMENTS

| | | | |
|---|---|---|---|
| 2,944,627 | 7/1960 | Skarstrom | 55/58 X |
| 3,155,468 | 11/1964 | de Montgareuil et al. | 55/25 |
| 3,164,454 | 1/1965 | Wilson | 55/68 |
| 3,182,435 | 5/1965 | Axt | 55/33 X |
| 3,237,377 | 3/1966 | Skarstrom | 55/33 X |
| 3,280,536 | 10/1966 | Berlin | 55/58 |
| 3,473,296 | 10/1969 | Tamura | 55/68 |
| 3,533,221 | 10/1970 | Tamura | 55/33 |
| 3,719,025 | 3/1973 | Heinze et al. | 55/31 |
| 3,796,022 | 3/1974 | Simonet et al. | 55/25 |
| 3,797,201 | 3/1974 | Tamura | 55/62 |
| 3,957,463 | 5/1976 | Drissel et al. | 55/58 X |
| 4,013,429 | 3/1977 | Sircar et al. | 55/33 |
| 4,065,272 | 12/1977 | Armond | 55/68 X |
| 4,144,037 | 3/1979 | Armond et al. | 55/68 X |
| 4,144,038 | 3/1979 | Armond | 55/68 X |
| 4,222,750 | 9/1980 | Gauthier et al. | 55/68 X |
| 4,331,455 | 5/1982 | Sato | 55/31 X |

Primary Examiner—Robert Spitzer
Attorney, Agent, or Firm—James C. Simmons; E. Eugene Innis

[57] ABSTRACT

A simplified low-cost system designed for home use in the direct administration of high purity oxygen to a patient, utilizes a single adsorption column containing successive layers of adsorbent. The first layer is composed of a molecular sieve adsorbent for removal of water and $CO_2$ from the air feed stream. The second layer is a molecular sieve adsorbent which preferentially retains nitrogen. The sequence and conditions of the several steps of the operating cycle are designed to recover a therapeutic gas stream of about 90% oxygen content.

6 Claims, 1 Drawing Figure

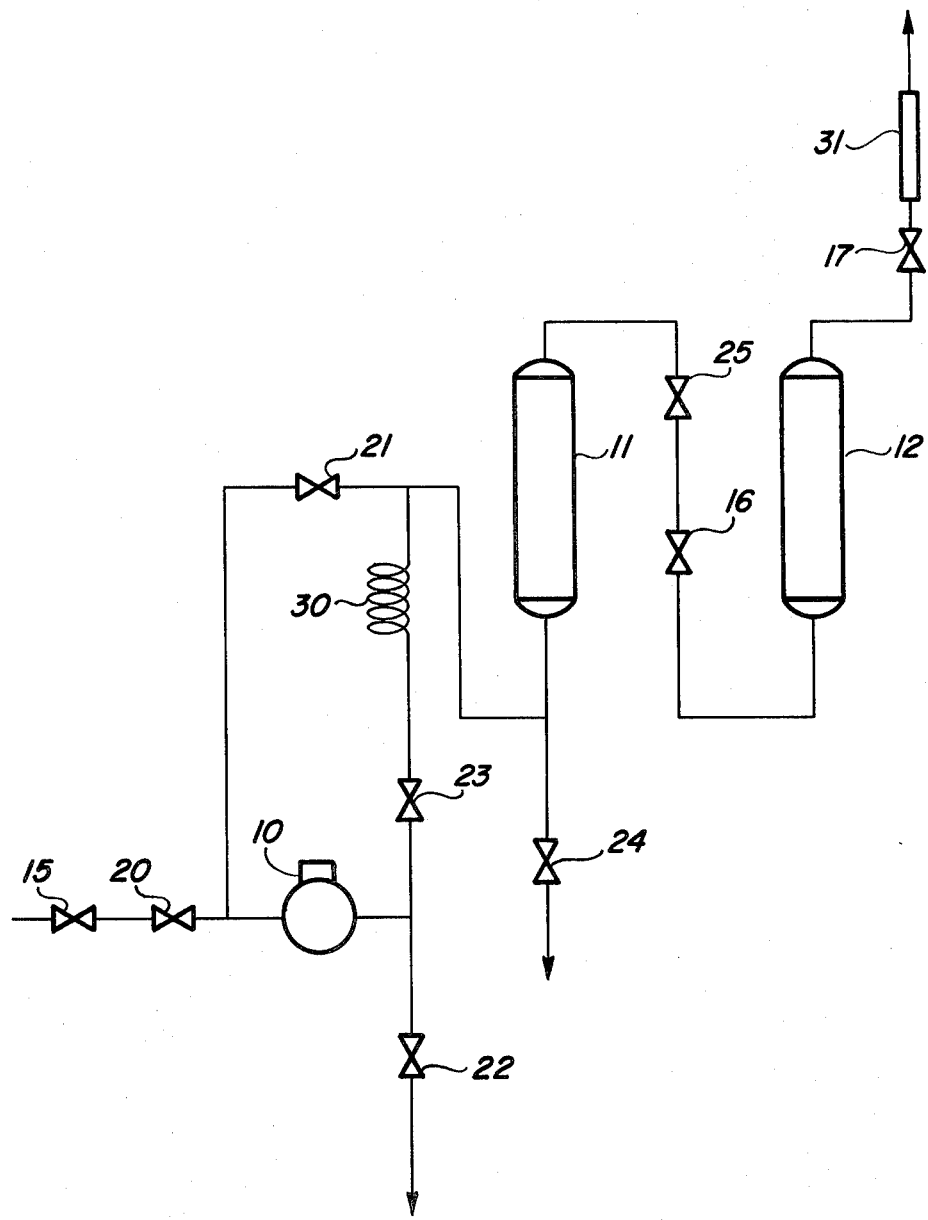

PRESSURE SWING ADSORPTION PROCESS FOR A MEDICAL OXYGEN GENERATOR FOR HOME USE

TECHNICAL FIELD

The present invention relates to non-cryogenic systems for recovery of oxygen from atmospheric air and is particularly concerned with the provision of a simplified low cost system for production of oxygen of high purity for direct medical administration.

BACKGROUND OF THE INVENTION

Systems for separation of air by selective sorption to recover oxygen and/or nitrogen are well known in the art. Typically, most of these systems employ zeolite molecular sieve adsorbent for selective retention of nitrogen while recovering an oxygen-enriched product stream. Periodically, as the sorbent bed reaches a designed level of sorbed gas, the bed is desorbed and/or purged to remove contained nitrogen before being returned to on stream operation. The adsorption-desorption cycles rely chiefly on swing in pressure level of these steps in the operating cycle. Also, to maintain continuity of operation a number of such adsorbent beds are operated in parallel, so that while one bed is operating on the adsorption step of the cycle, companion beds are at various stages of regeneration.

Illustrative of well-known prior art systems proposed for separation of components of air by selective adsorption is that disclosed in U.S. Pat. No. 2,944,627.

Numerous asserted improvements or modifications of the system described in the '627 patent are disclosed in the patent art. Among these are various sequences employing a vacuum desorption step for withdrawl of sorbed nitrogen from the adsorbent bed, as in U.S. Pat. Nos. 3,155,468; 3,164,454; 3,473,296 and 3,797,201. The listed patents suggest the possible use of a single column for carrying out the disclosed process.

It has also been proposed in a number of patents to remove water and $CO_2$ from the air feed prior to subjecting the same to selective adsorption for $N_2$—$O_2$ separation. U.S. Pat. No. 3,533,221 is illustrative of these. Preceding a nitrogen adsorption column the system employs two separate parallel alternately operating beds of sorbent for removal of water and $CO_2$. The moisture and $CO_2$-laden beds are regenerated thermally; one of these beds being heated and then cooled under purge while the other is on stream. The nitrogen laden column is desorbed by vacuum, the desorbed gas as it is being withdrawn passing through the water-$CO_2$ bed then under regeneration. Such operation sequence entails a complex arrangement of beds, valves and switching devices.

Pretreatment of the feed air in a separate bed to remove water and $CO_2$ is also disclosed in U.S. Pat. No. 3,796,022. The patent is more particularly concerned with operations wherein the desired recovered product is that obtained by desorption. Thus, in the case of air separation, wherein nitrogen is preferentially retained by the adsorbent bed, an elution step is had wherein the column is purged with nitrogen product gas in air feed direction, the purged product being withdrawn with aid of vacuum, and discharged to the atmosphere. In this manner, it is stated, the oxygen co-adsorbed with the nitrogen is eliminated, enabling recovery of high purity nitrogen by vacuum desorption applied at the opposite end of the column.

U.S. Pat. No. 3,280,536 describes an air separation system to increase the oxygen content of an enclosure, such as an entire room, to the range of 30 to 50% oxygen. While other known adsorbents for nitrogen are noted in the patent, including 13X zeolite, the stated preference is for 13X zeolite which has been partially substituted with strontium. The operating cycle is according to the principle of the aforementioned U.S. Pat. No. 2,944,627, and several hours are required to raise the room concentration to the 30% oxygen level. There is no indication in the patent of how the system could be employed to produce a product stream of high oxygen content, in the order of 90% $O_2$. The disclosed operating cycle includes an initial step of pressurizing the column to the super atmospheric working pressure with feed air. Under these conditions it would be difficult, if not impossible, to obtain high oxygen recovery at 90% purity.

In recent years there has been a significant increase in the demand for small scale oxygen generators for medical uses, to replace conventional gas cylinders.

SUMMARY OF THE INVENTION

Among the objects of the present invention is to provide an inexpensive medical oxygen generator of simplified construction and operation, capable of being used in the home for production of an enriched oxygen product gas which can be administered to a patient directly, as by means of a mask.

The foregoing objective is achieved by the particular sequence and operating conditions employed in accordance with the present invention. A single adsorption column is employed, and the product gas (high in oxygen) is collected in a surge vessel to enable continuous product withdrawl and use during alternating on and off stream periods in the operating cycle. The column contains at its air inlet end a layer of an adsorbent effective in removal of $CO_2$ and water from the feed air, over which layer the predominant adsorbent layer for selective nitrogen retention is placed. Prior to charging the feed air to the column in the adsorption step, the column is brought, by introduction of product gas, from vacuum oondition to an initial operating pressure slightly above atmospheric, at which time the feed air is continuously introduced through the column inlet until a pressure therein of several atmospheres is attained. A valve at the opposite end of the column is then opened and part of the gas contained in the column is thereby withdrawn to a surge vessel, from which vessel gas for desired use can be continuously withdrawn. The adsorbent column is then vented to the atmosphere in a direction opposite to that of the air feed, thus removing part of the adsorbed water and $CO_2$ at the feed inlet end of the column, in addition to the removal of some of the adsorbed nitrogen.

Regeneration of the adsorbents in the bed is now accomplished by evacuation at the air feed inlet end, whereby the remainder of the nitrogen, water and $CO_2$ are removed from the column. To return to on-stream operation the column is brought to atmospheric pressure or somewhat above using part of the oxygen-rich product gas from the surge vessel.

A preferred system for practice of the invention is illustrated in the accompanying drawing.

BRIEF DESCRIPTION OF THE DRAWINGS

The single FIGURE of the drawing is a process flow diagram of a preferred system for practice of the invention.

DETAILED DESCRIPTION

The main components of the system employed in practice of the invention comprise the vacuum pump 10 which also serves as a compressor, a single adsorption column 11, and the product storage tank 12. Pressure variations in the column during the operating cycle are achieved by operation of the valves in the gas flow lines leading into and out of the column. Certain of these valves are preset control valves; other valves are on-off solenoid valves controlled in known manner by a cam timer. In the illustrated embodiment, valves 15, 16, 17 are control valves; valves 20 to 25 are of the solenoid type. Column 11 contains at its air feed inlet a layer of molecular sieve adsorbent effective in removal of $CO_2$ and water from the feed air, above which layer a deeper layer of a molecular sieve effective in selective adsorption of nitrogen is had.

At the start of the operation, column 11 and gas storage vessel 12 are slightly above atmospheric pressure. Air is pumped into column 11 by operation of vacuum/compressor pump 10, valves 15, 20, 23, being open; valves 21, 22, 24 and 25 are closed. Feed of air into column 11 is continued until the preset maximum pressure is reached. The preset maximum pressure advocated is at a selected point in the range of 35 to 65 psig (3.4 to 5.5 bars).

When the preset maximum pressure is attained the air feed step of the cycle has been completed, at which time valve 23 automatically closes and valve 22 opens, so that the pump 10 is by-passed. Also, at this same time valve 25 is opened for withdrawl of contained gas from column 11. Said withdrawn gas, composed of oxygen enriched air generated during the air feed step, flows through control valve 16 into storage tank 12. The flow of oxygen enriched air into the storage tank 12 will continue until the pressure in the storage tank 12 equalizes that of column 11.

In the next step column 11 is vented to the atmosphere, which is achieved by the closing of valve 25 and the opening of valve 24. The vented gas thus passing through and out of the column in a direction counter to the direction that the feed air was initially introduced into the column. During the venting step part of the sorbed nitrogen is removed from the column and in flowing through the adjoining layer of adsorbent helps to remove part of the water and $CO_2$ that had been sorbed in that layer.

At the completion of the venting step, valves 20 and 24 are closed and valve 21 opened, thereby evacuating column 11 by the continued operation of pump 10.

When the preset vacuum has been attained in adsorption column 11, valve 21 is closed and valves 20 and 25 are opened, permitting flow of oxygen-rich product gas from storage tank 12 into column 11 in a direction counter to that of the initial air feed direction. In this step the pressure in column 11 is brought to superatmospheric level in the range of up to about 6 psig (= 1.43 bars) and the column is ready for introduction of feed air by closing valves 22 and 25 and opening valve 23 and repetition of the described cycle of operating steps. Product gas can be withdrawn from tank 12 for the desired medical administration during the entire operating cycle through control by valve 17.

The preferred adsorbent for removal of water and $CO_2$ from the feed air are alumina, gels, 13X or 5A zeolite. The preferred adsorbent for selective retention of nitrogen, which has been found in practice to achieve good results, is pelleted synthetic sodium mordenite. Other adsorbents like Ca and/or Sr exchanged 13X zeolites may also be used.

The evacuation of the column is best carried out to about 100–300 torr. A full operating cycle may be carried out in about one and one-half minutes according to the format set out in Table 1, showing the solenoid valve positions during the cycle (0=open, C=closed).

TABLE 1

| Time (secs) | \multicolumn{6}{c}{Valve Positions} | Steps |
|---|---|---|---|---|---|---|---|
| | 20 | 21 | 22 | 23 | 24 | 25 | |
| 0–35 | 0 | C | C | 0 | C | C | Pressurization |
| 35–42 | 0 | C | 0 | C | C | 0 | Product Withdrawl to Tank 12 |
| 42–49 | 0 | C | 0 | C | 0 | C | Depressurization |
| 49–84 | C | 0 | 0 | C | C | C | Evacuation |
| 84–90 | 0 | C | 0 | C | C | 0 | Introduction Product Gas |

By operation in accordance with the invention oxygen-enriched product gas of about 90% $O_2$ content is obtained, which can be used directly for desired medical administration to the patient. While adsorption systems have been heretofore marketed for this intended purpose, these typically obtain a low recovery of oxygen from the feed air, in the order of about 30%, even when using multiple beds and numerous switching valves. Although in practice of the present invention only a single adsorbent bed is used, oxygen recovery of 55 to 60% is made possible because of the efficiency of the process employed.

For most efficient operation, the air inlet system should be provided with an after-cooler, as indicated at 30, to lower the temperature acquired by the air stream as a result of its compression by the pump/compressor 10. Element 30 may be in the form of a finned heat exchanger. Also, the withdrawl rate of the high oxygen content product from storage tank 12 may be set by a flowmeter, in known manner, as indicated at 31. A continuous withdrawal by the user can be achieved. Other features (not shown) common to systems for administration of medical oxygen may be incorporated in the system of the invention, such as air filters, bacteria filters, humidifiers and the like.

What is claimed:

1. In the generation and recovery of high purity oxygen from an ambient air stream in a system employing a single adsorption column, the method which comprises the successive steps of:

(a) introducing pressurized air into the column containing an adsorbent bed, said bed comprising in the direction of air flow thereto a first shallow layer of an adsorbent effective in removal of water and $CO_2$ followed by a predominant second layer of an adsorbent selective in sorbing nitrogen from admixture with oxygen; said bed having been brought to adsorption pressure prior to said initial air introduction with a previously obtained product stream of high oxygen concentration to bring the same form subatmospheric to slightly above atmosphere pressure;

(b) continuing said introduction of pressurized air into said bed without withdrawal of product therefrom until said bed is brought to a maximum pressure of several atmospheres;
(c) then discontinuing said introduction of pressurized air and withdrawing from said bed, in the same direction as that in which the feed air was introduced, a part of the gas product contained therein and collecting said withdrawn part in a storage reservoir;
(d) thereafter venting the bed to the atmosphere in a direction counter to air feed direction, thereby removing a portion of the contained nitrogen from said second adsorbent layer and part of the contained water and $CO_2$ from said first adsorbent layer;
(e) next evacuating the bed in the same direction as in the preceding venting step (d) to remove remaining nitrogen, water and $CO_2$ from the respective adsorbent layer; followed by,
(f) restoring the bed to slightly above atmospheric pressure for repetition of the defined sequence by introducing therein a portion of the product gas of high oxygen concentration from said storage reservoir.

2. The method as defined in claim 1 wherein said evacuation in step (e) is carried out for a time to bring said bed to a pressure in the range of about 100 to 300 torr.

3. The method as definded in claim 1 wherein step (f) is carried out under conditions to repressure the evacuated bed from step (e) to superatmospheric pressure in the range of up to about 6 psig.

4. The method as defined in claim 1 wherein step (c) is continued to the point at which the pressures in the bed and in the storage reservoir are equalized.

5. The method as defined in claim 1 wherein the adsorbent in said second layer consists essentially of pelleted sodium mordenite.

6. The method as defined in claim 1 wherein said product gas recovered in step (c) has an oxygen concentration of about 90%.

* * * * *